United States Patent Office 3,001,003
Patented Sept. 19, 1961

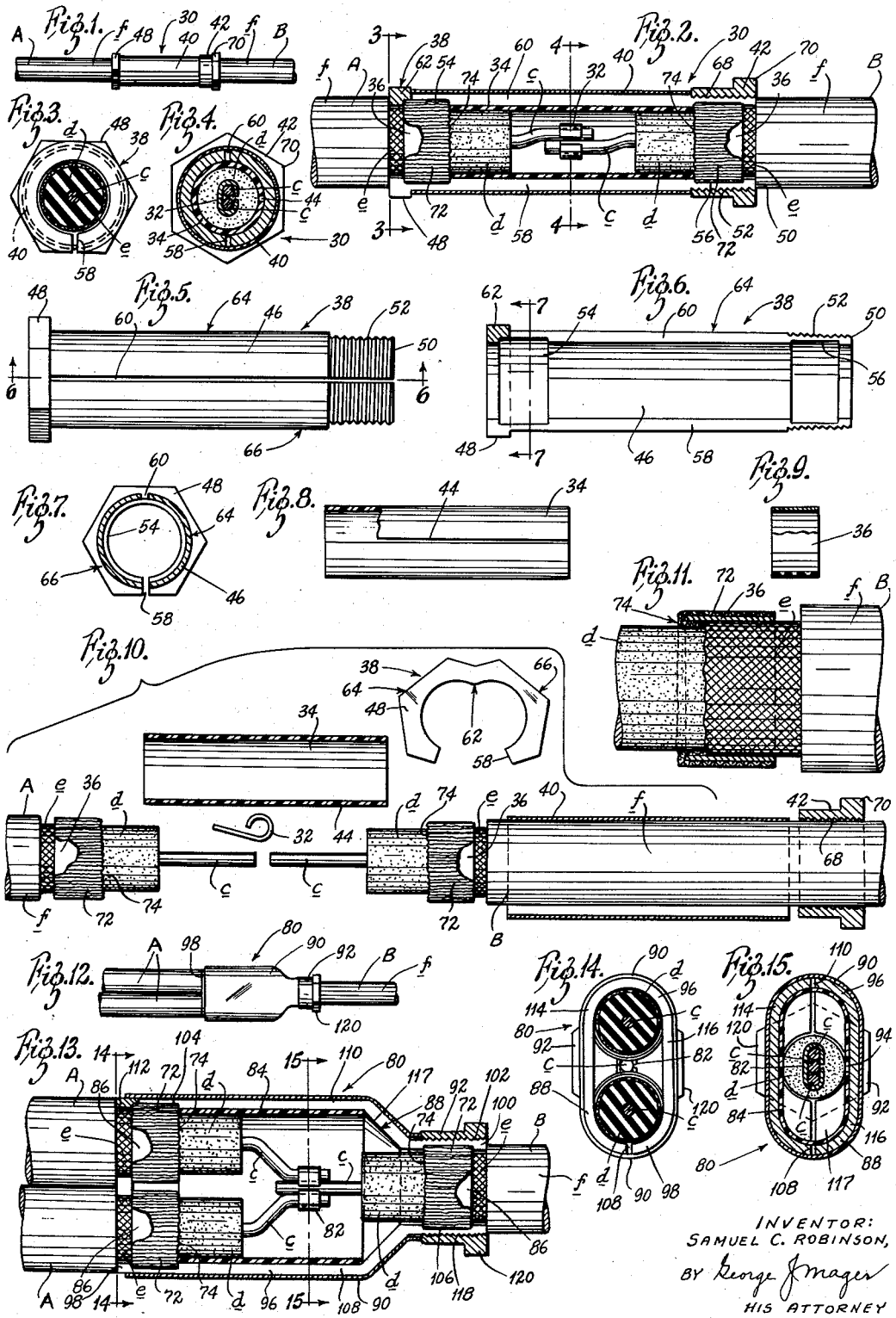

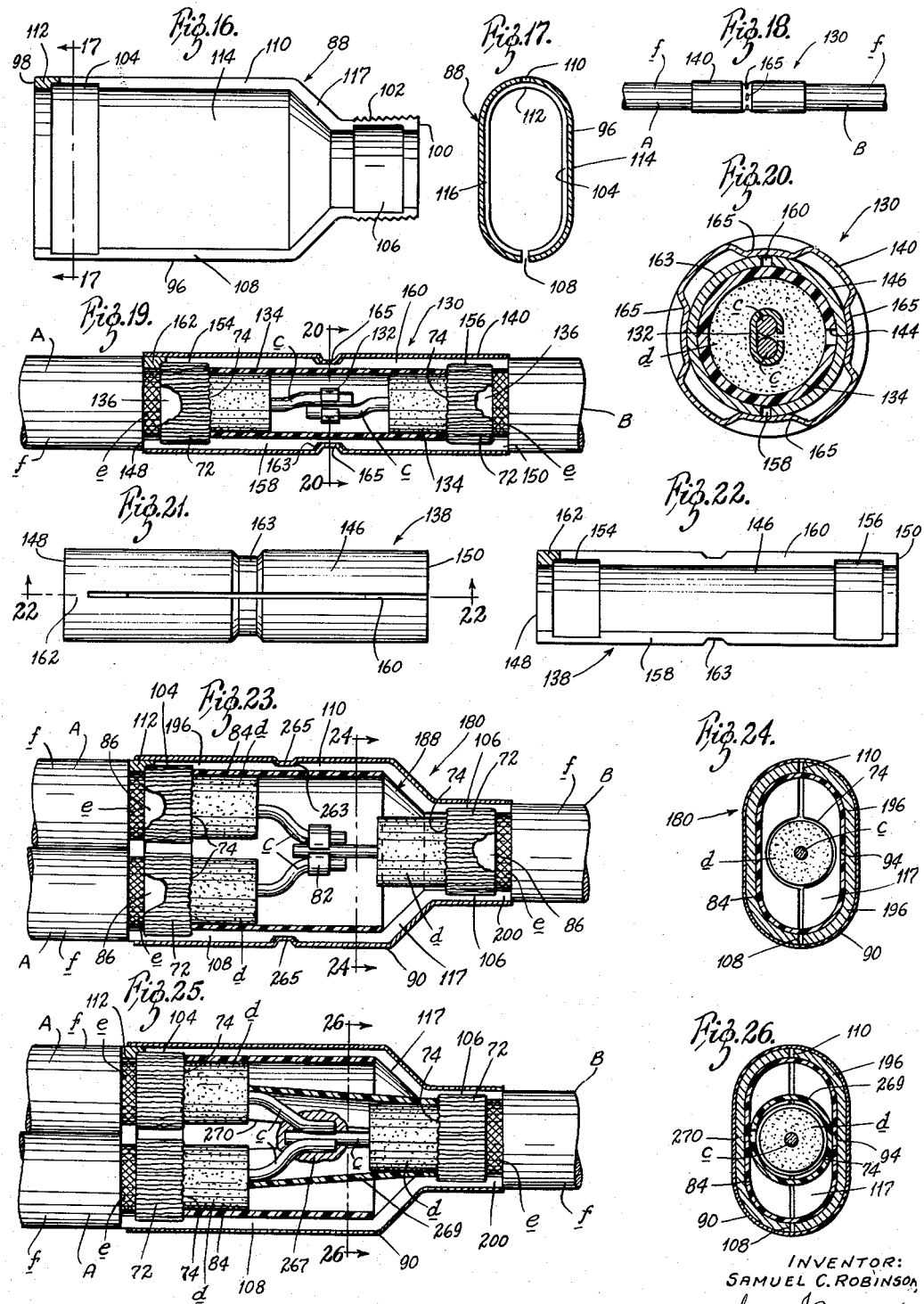

3,001,003
COAXIAL CABLE SPLICE
Samuel C. Robinson, New Albany, Ind., assignor to Robinson Machine Works, Inc., New Albany, Ind., a corporation of Indiana
Filed Jan. 14, 1960, Ser. No. 2,529
8 Claims. (Cl. 174—88)

The present invention relates generally to means for connecting electrical cables, and more particularly to novel and improved means for effectively splicing two or more coaxial cables.

Primarily, the present invention is directed to means for splicing coaxial cables of relatively small diameters, such as those commonly employed in electronic equipment, although it will be understood that the invention is not restricted to cables of small size. Furthermore, although the invention is primarily directed to splicing coaxial cables having corresponding diameters, it is to be understood that precise diameter correspondence of the cables is not critical.

The invention contemplates splices for various coaxial cable combinations. Thus for example, the invention is applicable to one to one cable combinations, two to two cable combinations, one to two cable combinations, one to three cable combinations, and so on. Wherefore, although in the present disclosure one to one cable and one to two cable splices have been illustrated and described, this has been done in an exemplary rather than in a restrictive sense.

Accordingly, it is the primary object of the present invention to provide simple and effective splices for the various combinations aforesaid that are permanent, that may be assembled quickly and easily, and that when assembled present compact arrangements readily adaptable to the limited space requirements of electronic and similar equipment.

It is another object of the invention to provide novel splices that in most cases may be assembled without the use of solder, although as will appear, such use is not excluded.

Another object of the invention is to provide splices that incorporate fewer parts than most splices currently in use, and occupy less space than splices made by means of connectors that require the application of tape thereto.

A further object of this invention is to provide splices that incorporate means for protecting the primary circuit against moisture, and means for insuring positive shield continuity.

As will appear, each of the splices herein disclosed and contemplated includes a novel housing member that is generally tubular in form, and is split longitudinally so as to provide two half sections connected at one end by a small unsevered segment of the housing. In consequence of this small unsevered segment, said housing may be spread for dispositioning about the stripped end portions of cables to be spliced, and thereupon restored to its original configuration with ease.

Basically, each of the splices herein disclosed and contemplated further includes: a metallic clip for integrating the central conductors or primaries of the cables to be spliced; a longitudinally split tubular insulator adapted to embrace the spaced and exposed end portions of the intermediate insulation of said cables; a pair of metallic ferrules or ring members adapted to encircle the spaced and exposed end portions of the braids or sheathings of the cables; an enclosing sleeve for disposition about the outer periphery of the housing member; and means for maintaining said sleeve in position.

The invention is illustrated on two sheets of drawings that accompany this specification, and a more comprehensive understanding of the advantages inherent therein may be had from the detailed description that follows with reference to these drawings. It will be understood that whenever employed hereinafter, terms such as "left," "right," "upper," "lower," "vertical," "horizontal" and so on, have reference to parts as viewed in the drawings, and have been adopted in the interest of descriptive clarity only.

In said drawings:

FIGURE 1 is an elevational view of a preferred cable to cable splice embodiment of the present invention;

FIGURE 2 is an axial sectional view, on an enlarged scale, of the splice assembly illustrated in FIGURE 1;

FIGURE 3 is a transverse sectional view taken on the line 3—3 of FIGURE 2;

FIGURE 4 is a transverse sectional view taken on the line 4—4 of FIGURE 2;

FIGURE 5 is an elevational view of a tubular splice housing member included in the assembly presented in FIGURES 1 through 4;

FIGURE 6 is a longitudinal sectional view taken on the line 6—6 of FIGURE 5;

FIGURE 7 is a transverse sectional view taken on the line 7—7 of FIGURE 6;

FIGURE 8 is an elevational view, partly in section, of a longitudinally split insulator included in the splice assembly of FIGURES 1 through 4;

FIGURE 9 is an elevational view, partly in section, of one of a pair of ferrules or ring members included in said assembly;

FIGURE 10 is a partially exploded view of the FIGURE 2 assembly, this view serving to illustrate the manner wherein the various components would be assembled as will be explained;

FIGURE 11 is an enlarged reproduction of a fragmentary portion of FIGURE 10, particularly illustrating the disposition of a FIGURE 9 ring in the completed splice assembly;

FIGURE 12 is an elevational view of a preferred single cable to a pair of cables splice embodiment of the present invention;

FIGURE 13 is an axial sectional view, on an enlarged scale, of the splice assembly illustrated in FIGURE 12;

FIGURE 14 is a transverse sectional view taken on the line 14—14 of FIGURE 13;

FIGURE 15 is a transverse sectional view taken on the line 15—15 of FIGURE 13;

FIGURE 16 is an axial sectional view of a tubular splice housing member included in the assembly illustrated in FIGURES 13 through 15;

FIGURE 17 is a transverse sectional view taken on the line 17—17 of FIGURE 16;

FIGURE 18 is an elevational view of another cable to cable splice embodiment of the present invention;

FIGURE 19 is an axial sectional view, on an enlarged scale, of the splice assembly illustrated in FIGURE 18;

FIGURE 20 is a transverse sectional view on a further enlarged scale, taken on the line 20—20 of FIGURE 19;

FIGURE 21 is an elevational view of a tubular splice housing member included in the assembly presented in FIGURES 18 through 20;

FIGURE 22 is a sectional view taken on the line 22—22 of FIGURE 21;

FIGURE 23 is a view similar to FIGURE 13, illustrating another single cable to a pair of cables splice embodiment of the present invention;

FIGURE 24 is a transverse sectional view taken on the line 24—24 of FIGURE 23;

FIGURE 25 is a view similar to FIGURE 23, illustrating a soldered cable connection and the employment of an auxiliary insulating sleeve; and FIGURE 26 is a transverse sectional view taken on the line 26—26 of FIGURE 25.

With particular reference to FIGURES 1 through 11, a preferred embodiment of the present invention is illustrated with respect to one end of a cable A leading from the left, and one end of a cable B leading from the right. Conventionally, the cables A and B each include: a primary or central conductor c surrounded by inner insulation d; a metallic braid or conductive electrostatic sheathing e surrounding said inner insulation; and a cover of outer insulation designated f.

In FIGURES 1 and 2, the assembled splice of the present invention there illustrated is designated generally by the numeral 30. The splice 30 includes a metallic clip 32, a tubular insulator 34, a pair of ferrules or ring elements 36, a tubular housing generally designated 38, a sleeve 40, and a hollow nut 42.

An end elevational view of the clip 32 appears in FIGURE 10. It comprises a single strip of thin metallic material that is sufficiently flexible to be crimped about a pair of contiguously disposed central conductors c, as best seen in FIGURE 4.

The insulator 34 is shown per se in FIGURE 8. It comprises a tubular body of resilient plastic material that has formed therein a longitudinal end to end slot designated 44. After the insulator 34 has been spread for disposition about the opposed end portions of the cable insulations d as will appear, it will revert at least approximately to its original configuration, as best seen in FIGURE 4.

One of the pair of ring elements 36 is shown per se in FIGURE 9. Comprised of thin metallic material, each ring 36 when placed in position as will appear, surrounds a portion of the sheathing e, and will have an integral segment of said sheathing combed out and bent back over its external periphery.

The housing 38 as hereinbefore mentioned, comprises an important feature of the invention, and is comprised of conductive material. Illustrated per se in FIGURES 5 through 7, said housing includes a tubular body portion 46 that merges at the left end into an enlarged polygonal section 48, said section being illustrated as hexagonal. The right or opposite end section 50 of the housing is reduced slightly, and is externally threaded as indicated at 52. Formed partially in the polygonal section 48 and partially in the body portion 46 of the housing, is an annular internal recess 54. A similar recess 56 is formed in the section 50.

Diametrically opposite longitudinal slots are cut in the housing 38 as shown. The first of these slots is designated 58, and extends from end to end of the housing. The second of these slots is designated 60 and extends from the polygonal section 48 to the opposite end of the housing. Consequently, as seen to best advantage in FIGURE 6, a comparatively small segment 62 of the housing 38 is unsevered, said segment serving, so to speak, as a hinge about which the housing half sections 64 and 66 may be first distended as suggested in FIGURE 10, and then swung to their original disposition as will be more fully explained.

The sleeve 40 is made of thin metallic material, and its internal peripheral surface is such as to slidably engage the outer peripheral surface of the tubular body portion 46 of the housing, when the sleeve is properly disposed in the completed splice assembly, as shown particularly in FIGURE 4.

The nut 42 is internally threaded as indicated at 68, and is provided with a polygonal head 70, the head illustrated being hexagonal. As shown particularly in FIGURE 2, the threads 68 are so formed as to cooperate with the threads 52 of the housing end section 50.

*Assembly*

Although it is believed that the manner of assembling the splice 30 should be apparent from an inspection of FIGURE 10, a brief explanation will be given.

The steps would consist of stripping the ends of the cables A and B, then disposing the ring members 36 over the thus exposed end portions of the sheathings e in such fashion that a determined gap or space obtains between the outer edges of said rings and the adjacent faces of the outer insulation covers f. Thereupon the inner end remainders of the sheathings would be combed and bent back over the external peripheries of the rings, as shown on a large scale in FIGURE 11, said combed and reversely bent sheathing segments being designated 72. Next, the sleeve 40 would be slid onto the cable B, followed by the nut 42.

It is to be noted at this point, that obviously in order to obtain compact splices in accordance with the concepts of this invention, the various parts are designed for close cooperation, as is understood. Thus for example, the insulator 34 is designed to determine the spacing between the opposed inner edges 74 of the reversely bent sheathing portions 72, so that the said portions will extend into intimate contact with the internal recesses 54 and 56 of the housing 38 when the latter is applied.

Wherefore, first employing the insulator 34 in a guide capacity, the next assembly operations would consist of appropriately crimping the clip 32 about the contiguously placed primary conductors c, and thereupon spreading said insulator to dispose it in position with its extremities encompassing the exposed end portions of the cable insulations d.

Next, the half sections 64 and 66 of the housing 38 would be spread apart, the unsevered segment 62 functioning in a hinge capacity so that though distended, said half sections remain connected by means of the segment 62 aforesaid.

With the housing 38 spread apart, the thus far assembled elements would be fitted into for example the half section 64, care being exercised to insure that the sheathing portions 72 are disposed in the half recesses 54 and 56.

Thereupon, the half section 66 would be brought into registry with the half section 64, the segment 62 serving as a pivot. Next, the sleeve 40 would be slid leftwardly onto the housing until its leading end contacted the rear face of the end section 48, thus disposing the threads 52 of the section 50 in alignment for engagement by the threads 68 of the nut 42, that would now be applied. As should be apparent, the polygonal end section 48 of the housing 38 and the similar head 70 of the nut 42 serve to facilitate the final step of the assembly operations by the employment of pliers and the like.

From the foregoing, it should be manifest that a compact cable to cable splice is readily effected in accordance with the teachings of this invention. The longitudinally slotted housing 38, providing identical half sections that may be distended and thereafter realigned, is particularly efficacious in the production of a neat, compact, and highly effective coaxial cable splice assembly. The sleeve 40 initially serves to align the half sections of the housing end 50 whereby to facilitate application of the nut 42, and after said nut has been applied, this sleeve maintains the housing halves 64 and 66 in alignment and simultaneously in firm contact with the reversely bent sheathing portions 72. Consequently, the conductive housing 38 insures a positive, continuous connection between the electrostatic sheathings e of the cables A and B.

With particular reference now to FIGURES 12 through 17, a preferred embodiment of the present invention is illustrated with respect to the ends of a pair of cables A leading from the left, and the end of a single cable B leading from the right. The illustrated one to two cable splice assembly is designated generally by the numeral 80, and includes the same type of elements as the previously described one to one cable splice assembly 30. Thus it includes a metallic clip 82, a tubular insulator 84, three ring elements 86, a tubular housing generally designated 88, a sleeve 90, and a hollow nut 92.

The clip 82 is similar to the clip 32 in all respects except that it is somewhat larger, inasmuch as it serves to integrate three instead of two central conductors c. The tubular insulator 84 is similar in all respects to the insulator 34 except that it is elliptic or oblong instead of being circular in cross section. The end to end longitudinal slot formed therein is designated 94, and appears in FIGURE 15.

The ring elements 86 are similar to the ring element 36 of FIGURE 9. It is to be noted however, that a single elliptic or oblong ring element (not shown) may be substituted for the pair of circular ring elements 86 that partially appear at the left in FIGURE 13.

The housing 88 is of conductive material and appears per se in FIGURES 16 and 17. It includes a tubular body portion 96 that is generally similar to the body portion 46 of the housing 38, except that it is elliptic instead of circular in cross section, and is devoid of a polygonal formation at its left end 98. The right end section 100 of the housing 88 is identical with the similar section 50 of the housing 38, and is provided with external threads 102. Recesses 104 and 106 are provided in the inner peripheral surface of the body portion 96. The recess 104, as best seen in FIGURE 17, is elliptic so as to encompass a pair of adjacently disposed reversely bent sheathing portions 72. The recess 106 is identical with the recess 56 of the housing 38.

Diametrically opposite longitudinal slots are cut in the housing 88 as shown. The first of these slots is designated 108, and extends from end to end of the housing. The second of these slots is designated 110, and extends from the left end section 98 of the housing to the opposite end section 100 thereof. Consequently, a comparatively small segment 112 of the housing is unsevered, said segment serving, so to speak, as a hinge about which the housing half sections 114 and 116 may be first distended, and thereafter swung to their original disposition. Numeral 117 designates a converging section of the body 96, said section serving to connect the elliptical main portion of said body with the cylindrical end section 100 thereof as should be manifest.

The sleeve 90 is made of thin metallic material, and includes a converging portion corresponding with the converging section 117 of the housing. Its inner peripheral surface is such as to slidably engage the outer peripheral surface of the tubular body portion 96 of the housing when said sleeve is properly disposed in the completed splice assembly 80, as shown particularly in FIGURE 13.

The nut 92 is identical with the hereinbefore described nut 42. It is provided with internal threads 118, and a polygonal head 120, the head illustrated being hexagonal. As clearly shown in FIGURE 13, the threads 118 are so formed as to cooperate with the threads 102 of the housing end section 100. When the nut 92 has been properly applied as shown, further leftward movement of the sleeve 90 is arrested by the section 117 aforesaid.

In view of the drawings presented in FIGURES 13 through 17 and reference to the explanation presented hereinbefore, it is not deemed necessary to describe in detail the step by step operations of assembling the splice 80. The procedure is identical, except that additional space must be provided between the right end marginal edge of the insulator 84 and the inner edge 74 of the sheathing portion 72 of cable B, in order to compensate for the body section 117, as should be understood.

Thus, it should be manifest that a compact one to two cable splice may be readily effected. As in the case of the housing 38 with respect to the splice assembly 30, the longitudinally slotted housing 88 plays the most important role in facilitating the production of the splice assembly 80.

With attention directed to FIGURES 18 through 22, another embodiment of a cable to cable splice assembly contemplated by the present invention is illustrated with respect to one end of a cable A leading from the left, and one end of a cable B leading from the right. The assembly shown is designated generally by the numeral 130, and includes substantially the same number and type of elements as the previously described splice assembly 30, except that the nut 42 and the polygonal left end section 48 are not required in this embodiment.

Categorically, the assembly 130 includes a clip 132, a tubular insulator 134, a pair of ring elements 136, a tubular housing of conductive material generally designated 138, and a sleeve 140. The clip 132, the tubular insulator 134, and the ring elements 136 are all counterparts respectively of the elements 32, 34, and 36. The end to end longitudinal slot provided in the insulator 134 appears in FIGURE 20 and is there identified by the numeral 144.

The tubular housing 138 appears per se in FIGURES 21 and 22. It includes a body portion 146 terminating in left and right end sections designated respectively by numerals 148 and 150. Annular recesses 154 and 156 are provided in the internal periphery of the body 146, and diametrically opposite longitudinal slots 158 and 160 are cut therein so as to provide an unsevered hinge segment 162 for purposes that are now deemed to be apparent. Intermediate the ends 148 and 150 thereof, the housing 138 has formed in the body portion 146 thereof an annular external depression or groove designated 163, preferably but not necessarily of the configuration shown.

Prior to its incorporation into the illustrated splice assembly 130, the sleeve 140 is cylindrical throughout its length, and similarly to the sleeve 40, may first be readily slid onto the cable B and then onto the housing 138 during the assembling procedure. Said procedure is similar to that described with respect to the splice assembly 30, and will not therefore be explained in detail. The principal difference resides in the final step. In other words, whereas the final step in the earlier instance consisted in applying the nut 42, the final step with respect to the splice 130 comprises crimping the sleeve 140 at spaced points into the groove 163. The number of crimpings is optional. Four circularly spaced crimps 165 are exemplarily illustrated in FIGURE 20.

With reference now to FIGURES 23 and 24, another one to two cable splice embodiment of the present invention is illustrated with respect to a pair of cables A leading from the left and a single cable B leading from the right. This splice assembly is generally designated 180 and is similar in most respects to the assembly 80, wherefore the same reference numerals have been applied to the corresponding parts. Instead of being provided with external threads however, the right end section 200 of the tubular housing 188 is smooth, the nut 92 being dispensed with in this embodiment. Furthermore, intermediate its ends, the housing 188 has formed in the body portion 196 thereof an annular external depression or groove designated 263, preferably but not necessarily of the configuration shown.

Thus, the final step in assembling the splice 188 would consist in crimping the sleeve 90 at a plurality of spaced points into the groove 263. The crimps shown are designated by the numerals 265.

From the foregoing description and the drawings, it should be manifest that the present invention contemplates various modifications without departing from the main concept and spirit thereof. Some exemplary modifications appear in the one to two cable splice assembly illustrated in FIGURES 25 and 26. For identification purposes, elements and parts hereinbefore described have been given similar reference numerals in these two views.

It will be observed that in this modified exemplary splice, the three primary conductors c are integrated by means of solder designated 267 instead of by clips such as the clip 82. Furthermore, it will be observed that an additional inner insulator 269, having a longitudinal end to end slot 270 formed therein, may be disposed about said integrated primary conductors as shown.

Wherefore it is to be understood that the present invention is not to be limited to the precise details illustrated and described, but also contemplates other modifications that may fall within the purview of the claims hereunto appended.

What I claim is:

1. In a splice for a pair of coaxial cables, the combination comprising: means integrating the stripped and contiguously disposed end portions of the primary conductors of said cables; a tubular insulator of resilient plastic material having its ends disposed about the opposed exposed end portions of the inner insulation of said cables, said insulator having an end to end longitudinal slot therein so that it may be spread whereby to effect the disposition thereof aforesaid; a tubular housing of conductive material having a pair of diametrically opposite longitudinal slots therein, one of said slots extending from end to end of the housing and the other of said slots terminating short of one end thereof whereby to form a hinge segment about which the thus formed half sections of the housing may be spread and thereafter realigned, said last named end of the housing having an enlarged polygonal external periphery; a pair of longitudinally spaced annular recesses formed in the inner periphery of the housing; a pair of ring elements each encompassing part of one of the opposed exposed ends of the electrostatic sheathings of said cables and having portions of said sheathings reversely bent and combed to overlie the peripheries of said rings, said sheathing portions being disposed in intimate contact with the annular recesses aforesaid of the housing in said realigned disposition thereof; an enclosing sleeve slidably fitted over the tubular housing; an externally threaded slightly reduced section constituting the opposite end of the housing; and an internally threaded nut having an outstanding polygonal flange integral therewith, said nut engaging the threaded end section of the housing whereby to maintain said sleeve in place about said housing between that end of the housing having the polygonal external periphery and the body of said nut.

2. In a splice for a pair of coaxial cables, the combination comprising: the elements as set forth in claim 1, wherein the means integrating the stripped and contiguously disposed end portions of the primary conductors of said cables consists of a clip formed of a single piece of flexible metallic material bent and crimped about said end portions.

3. In means for splicing a pair of coaxial cables, the combination comprising: a flexible metallic clip integrating the primary conductors of said cables; a tubular insulator having its ends disposed about the opposed exposed end portions of the insulation of said cables, said insulator having an end to end slot therein; a tubular housing of conductive material having a pair of diametrically opposite slots therein, one of said slots extending from end to end of the housing and the other of said slots terminating short of one end thereof whereby to form a hinge segment about which the thus formed half sections of the housing may be spread and realigned; a pair of ring elements each adapted to encompass part of the exposed sheathing of one of said cables and have portions of the exposed sheathing reversely bent and combed to overlie the periphery of said ring; a pair of longitudinally spaced annular recesses formed in the internal periphery of the housing; an enclosing sleeve slidable thereonto disposed about said slotted housing; an enlarged polygonal section comprising one end of said housing; an externally threaded slightly reduced section comprising the opposite end of said housing; and an internally threaded nut engaging the externally threaded section aforesaid; said sleeve being disposed about the housing between the polygonal section and said nut whereby to maintain said half sections in alignment and to simultaneously maintain the reversely bent and combed sheathing portions in firm contact with the annular recesses aforesaid.

4. For incorporation in a coaxial cable splice of the character described, a housing of conductive metallic material including: a tubular body portion merging at one end into an enlarged polygonal section whereto a tool may be applied, and at the opposite end into a slightly reduced in diameter externally threaded section; an annular internal recess formed partially in said body portion and partially in said polygonal section; a similar recess formed in said externally threaded section; and oppositely disposed first and second longitudinal slots cut in the housing, said first slot extending from end to end thereof and said second slot extending from the polygonal section aforesaid to the opposite end thereof whereby a comparatively small unsevered segment provides hinge means about which the thus formed half sections of the housing may be distended and subsequently realigned.

5. For incorporation in a coaxial cable splice of the character described: a housing of conductive metallic material as set forth in claim 4 wherein the cross sectional configuration of the recited body portion is elliptical, and wherein a divergent section connects said elliptical body portion with the recited externally threaded end section of said housing.

6. In a splice for splicing one coaxial cable to a pair of coaxial cables, the combination comprising: means integrating the stripped and contiguously disposed end portions of the primary conductors of said cables; a resilient tubular insulator having its ends disposed about the opposed exposed end portions of the insulation of said cables, said insulator having an end to end slot therein; a tubular housing of conductive metallic material having a pair of diametrically opposite slots therein, one of said slots extending from end to end of the housing and the other of said slots terminating short of one end thereof whereby to form a hinge segment about which the thus formed half sections of the housing may be spread and subsequently realigned, said hinge segment being located in an enlarged polygonal section forming said last named end of the housing; ring elements each adapted to encompass part of one of the exposed sheathings of said cables and have portions of the exposed sheathing reversely bent and combed to overlie the periphery of the ring; a pair of longitudinally spaced annular recesses formed in the internal periphery of the housing and adapted to encompass said reversely bent and combed exposed sheathing portions; an enclosing sleeve slidable thereonto disposed about said slotted housing; and an externally threaded section on one end of said housing cooperative with an internally threaded nut for maintaining said sleeve in position about the body of said housing; said sleeve being confined between said enlarged polygonal section of the housing and said nut and serving to maintain the half sections of the housing in alignment, and simultaneously to maintain said annular recesses in intimate contact with the reversely bent and combed sheathing portions aforesaid.

7. In a splice for splicing one coaxial cable to a pair of coaxial cables, the combination comprising: a flexible metallic clip integrating the stripped and contiguously disposed end portions of the primary conductors of said cables; a resilient tubular insulator having its ends disposed about the opposed exposed end portions of the insulation of said cables, said insulator having an end to end slot therein whereby it may be spread and snapped into the disposition aforesaid; a tubular housing of conductive material having a pair of diametrically opposite slots therein, one of said slots extending from end to end of the housing and the other of said slots terminating short of one end thereof whereby to form a hinge segment about which the thus formed half sections of the housing may be spread and subsequently realigned, said housing including an elliptical body portion connected by a converging section to a cylindrical externally threaded end section; ring elements encompassing the exposed sheathings of said cables and have portions thereof reversely bent and combed to overlie the peripheries of said rings; a pair of longitudinally spaced recesses formed in the inner periphery of the housing, one of said recesses being elliptical and the other being circular, said recesses being adapted to firmly engage the reversely bent and combed portions aforesaid of the sheathings when the half sections of the housing are in alignment; an enclosing sleeve slidable thereonto disposed about said slotted housing; and an internally threaded nut engaging the externally threaded section aforesaid whereby to retain said sleeve in position on said housing; said sleeve serving to maintain the half sections of the housing in alignment and simultaneously to maintain said recesses in intimate contact with the reversely bent and combed sheathing portions aforesaid.

8. In a cable splice assembly of the character described, said assembly including a tubular housing of conductive material and comprised of half sections integrated at one end by a comparatively small hinge-like segment, and a sleeve slidable thereonto encompassing said housing, said sleeve serving to maintain the housing half sections in alignment: groove means in the external peripheral surface of said housing adapted to receive a plurality of peripherally spaced crimped portions of said sleeve whereby to prevent endwise movements of the sleeve in both directions.

References Cited in the file of this patent
UNITED STATES PATENTS

| | | |
|---|---|---|
| 1,689,420 | Buck et al. | Oct. 30, 1928 |
| 2,133,448 | Harley | Oct. 18, 1938 |
| 2,536,003 | Du Pre | Dec. 26, 1950 |
| 2,884,477 | Trickle | Apr. 28, 1959 |
| 2,907,976 | Damon | Oct. 6, 1959 |